United States Patent
Kobayashi

(10) Patent No.: US 10,516,279 B2
(45) Date of Patent: Dec. 24, 2019

(54) POWER RECEIVING DEVICE, CONTROLLER THEREOF, ELECTRONIC APPARATUS INCLUDING THE SAME, AND CONTROL METHOD OF POWER FEED SYSTEM

(71) Applicant: ROHM CO., LTD., Ukyo-Ku, Kyoto (JP)

(72) Inventor: Shinya Kobayashi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/419,461

(22) Filed: Jan. 30, 2017

(65) Prior Publication Data

US 2017/0229892 A1 Aug. 10, 2017

(30) Foreign Application Priority Data

Feb. 5, 2016 (JP) ................................. 2016-020514

(51) Int. Cl.
*H02J 7/00* (2006.01)
*H01R 24/60* (2011.01)
*H01R 107/00* (2006.01)

(52) U.S. Cl.
CPC ............ *H02J 7/0052* (2013.01); *H01R 24/60* (2013.01); *H01R 2107/00* (2013.01); *H02J 2007/0062* (2013.01)

(58) Field of Classification Search
CPC .. H02J 7/04; H02J 7/004; H02J 7/0008; H02J 7/0052; H02J 7/007; H02J 7/0072
USPC .................. 310/149; 320/107, 149
See application file for complete search history.

(56) References Cited

U.S. PATENT DOCUMENTS

| 2010/0308777 | A1* | 12/2010 | Veselic | H02J 7/0068 320/164 |
| 2013/0082662 | A1* | 4/2013 | Carre et al. | H02J 7/0052 320/134 |
| 2015/0008749 | A1* | 1/2015 | Rhee | G06F 1/266 307/80 |
| 2015/0112522 | A1* | 4/2015 | Liang | B60W 10/06 701/22 |
| 2015/0162828 | A1* | 6/2015 | Sandner | H02M 3/158 323/271 |
| 2015/0301552 | A1* | 10/2015 | Lim | H02J 7/0052 327/538 |

(Continued)

FOREIGN PATENT DOCUMENTS

JP 06284593 A 10/1994
JP 11143591 A 5/1999
(Continued)

OTHER PUBLICATIONS

JPO Notice of Reasons for Refusal corresponding to Application No. 2016-020514; dated Jul. 2, 2019.

*Primary Examiner* — Paul Dinh
(74) *Attorney, Agent, or Firm* — Cantor Colburn LLP

(57) ABSTRACT

A power receiving device, which receives power from a power feed device via a removable cable, includes: a battery; a charging circuit configured to charge the battery with a bus voltage received from the power feed device via the cable; and a controller configured to communicate with the power feed device and instruct a target value of the bus voltage, wherein the controller adaptively changes the target value of the bus voltage according to a state of the power receiving device.

15 Claims, 6 Drawing Sheets

(56) References Cited

U.S. PATENT DOCUMENTS

2017/0187200 A1* 6/2017 Somerville ........... H02J 7/0052
2017/0201107 A1* 7/2017 Yang .................... H02J 7/0044
2017/0334427 A1* 11/2017 Butcher ................. B60K 6/48

FOREIGN PATENT DOCUMENTS

| JP | 2006060977 A | 3/2006 |
| JP | 2006304500 A | 11/2006 |
| JP | 2013132183 A | 7/2013 |
| JP | 2013198262 A | 9/2013 |

* cited by examiner

POWER RECEIVING DEVICE, CONTROLLER THEREOF, ELECTRONIC APPARATUS INCLUDING THE SAME, AND CONTROL METHOD OF POWER FEED SYSTEM

CROSS-REFERENCE TO RELATED APPLICATION

This application is based upon and claims the benefit of priority from Japanese Patent Application No. 2016-020514, filed on Feb. 5, 2016, the entire contents of which is incorporated herein by reference.

TECHNICAL FIELD

The present disclosure relates to a technique for feeding power to an electronic apparatus.

BACKGROUND

Battery-driven devices, such as mobile phone terminals, smart phones, tablet terminals, notebook computers, portable audio players, and the like, incorporate a rechargeable secondary battery and a charging circuit for charging the battery. Some charging circuits charge secondary battery using a DC voltage (bus voltage $V_{BUS}$) supplied from the outside via a USB cable or a DC voltage from an external AC adapter.

Currently, charging circuits installed in mobile devices are mainly based on a standard called USB Battery Charging Specification (hereinafter referred to as BC standard). There are several types of USB hosts or chargers (hereinafter collectively referred to as USB power feed devices). The BC revision 1.2 standard defines SDP (Standard Downstream Port), DCP (Dedicated Charging Port) and CDP (Charging Downstream Port) as types of USB power feed devices. In addition, a current (current capacity) which can be supplied by a USB power feed device is defined in the BC revision 1.2 standard according the type of USB device. Specifically, 1500 mA is defined for DCP and CDP and 100 mA, 500 mA and 900 mA are defined for SDP depending on the version of USB.

A standard called USB Power Delivery (hereinafter referred to as PD standard) has been formulated as the next generation secondary battery charging format and system using USB. According to the PD standard, suppliable power increases greatly from 7.5 W of the BC standard to the maximum of 100 W. Specifically, the PD standard allows a supply of voltage (specifically, 12 V or 20 V) higher than 5 V as a USB bus voltage, and thus a supply of charging current (specifically, 2 A, 3 A or 5 A) larger than that in the BC standard is also allowed. The USB PD is also supported in the USB type-C standard.

FIG. 1 is a block diagram of a power feed system 100R studied by the present inventor. This power feed system 100R conforms to the USB type-C standard and includes a power feed device 200R and a power receiving device 300R which are interconnected via a USB cable 102. The power receiving device 300R is mounted on a battery-driven electronic apparatus 400R such as a smart phone, a tablet terminal, a digital camera, a digital video camera, a portable audio player or the like.

The power feed device 200R includes a power supply circuit 202, a PD controller of a power feed side (hereinafter referred to as a power feed side controller) 204, and a receptacle 206. The USB cable 102 is detachably connected to the receptacle 206. There is also a charging adapter in which the USB cable 102 is integrated with the power supply device 200R without the receptacle 206.

The receptacle 206 includes a VBUS terminal for supplying a bus voltage $V_{BUS}$, a GND terminal for supplying a ground voltage $V_{GND}$, and a CC (Configuration Channel) terminal. The power supply circuit 202 generates the bus voltage $V_{BUS}$. The power supply circuit 202 may include an AC/DC converter which receives an AC voltage of 100 V from an external power supply (for example, a commercial AC power supply) (not shown) and converts it to a DC bus voltage $V_{BUS}$. The bus voltage $V_{BUS}$ generated by the power supply circuit 202 is supplied to the power receiving device 300R via a bus line of the USB cable 102.

The power feed side controller 204 is connected to a PD controller of the power receiving side (hereinafter referred to as a power receiving side controller) 306 via the USB cable 102. The power feed side controller 204 and the power receiving side controller 306 provide a communication function between the power feed device 200R and the power receiving device 300R. In the USB PD standard, the CC terminal is omitted and it is configured to communicate between the power feed device 200R and the power receiving device 300R via a bus line.

The electronic apparatus 400R includes a receptacle 402 and a load 404 in addition to the power receiving device 300R. The load 404 includes a CPU, a memory, a liquid crystal display, an audio circuit and the like. The power feed device 200R is detachably connected to the receptacle 402 via the USB cable 102.

The power receiving device 300R includes a battery 302, a charging circuit 304, the power receiving side controller 306, a microcontroller 308 and a power supply circuit 320. The battery 302 is a rechargeable secondary battery. The charging circuit 304 receives the bus voltage $V_{BUS}$ (also referred to as an adapter voltage $V_{ADP}$ on the side of the power receiving device 300R) from the power feed device 200R via the USB cable 102 and charges the battery 302 with the bus voltage $V_{BUS}$. The charging circuit 304 is composed of a step-down DC/DC converter, a linear regulator or a combination thereof and, therefore, must satisfy a relationship of $V_{ADP} > V_{BAT}$ in order to charge the battery 302.

A system voltage $V_{SYS}$ corresponding to at least one of the bus voltage $V_{BUS}$ (adapter voltage $V_{ADP}$) and the voltage $V_{BAT}$ of the battery 302 is supplied from the charging circuit 304 to the power supply circuit 320. The power supply circuit 320 steps up or steps down the system voltage $V_{SYS}$ and supplies a power source voltage $V_{DD}$ to each circuit block of the load 404. The power supply circuit 320 is a multi-channel power supply including a power management IC (Integrated Circuit), a DC/DC converter, a linear regulator and the like.

The power receiving side controller 306 is a port controller related to the USB type-C and communicates (negotiates) with the power feed side controller 204 via the CC line. The microcontroller 308 generally controls functions related to USB charging and power management in the power receiving device 300R.

FIG. 2 is a graphical diagram showing a process of determining the bus voltage $V_{BUS}$ in the USB PD standard of FIG. 1. Here, as an example, it is assumed that the power feed device 200R supports 5 V, 9 V and 12 V. The battery 302 is, for example, a two-cell lithium ion battery and the battery voltage $V_{BAT}$ varies in a range of 6 V to 9 V. In order to charge this battery 302, a bus voltage $V_{BUS}$ of 9 V or higher is required. A priority of the bus voltage $V_{BUS}$ (for example, 9 V, 12 V, 20V) requested to the power feed device 200R is defined in the power receiving side controller 306 or the microcontroller 308.

When the power feed device 200R is connected to the power receiving device 300R via the USB cable 102 at time t0, an initial bus voltage $V_{BUS}$ of 5 V is supplied to the power receiving device 300R, thereby establishing a link between the power receiving side controller 306 and the power feed side controller 204 (t1). The power receiving side controller 306 communicates (negotiates) with the power feed side controller 204 and requests the power feed side controller 204 to provide the bus voltage $V_{BUS}$ of 9 V or higher (t1 to t2). In this example, since the power feed device 200R supports 9 V, the request of the bus voltage $V_{BUS}$=9 V is accepted. Then, after time t2, the bus voltage $V_{BUS}$ of 9 V is supplied and a charging operation starts. The battery voltage $V_{BAT}$ rises with the charging operation.

The present inventor has studied the power feed system 100R of FIG. 1 and has recognized the following problems.

The efficiency of the charging circuit 304 depends on its input voltage $V_{ADP}$ and the battery voltage $V_{BAT}$ (the system voltage $V_{SYS}$). In the conventional power feed system 100R, once the bus voltage $V_{BUS}$ is set by negotiation, the set value of the bus voltage $V_{BUS}$ is thereafter fixed. That is, the input voltage of the charging circuit 304 is constant. On the other hand, the battery voltage $V_{BAT}$ varies depending on the SOC (State Of Charge) of the battery 302. Therefore, in the process of charging (or discharging) the battery 302, the efficiency of the charging circuit 304 may be significantly lowered depending on the magnitude of the battery voltage $V_{BAT}$. Reduction in the efficiency of the charging circuit 304 is undesirable from the viewpoint of energy saving and also causes a problem of prolonging the charging time of the battery 302.

In addition, when the system is operated with the bus voltage $V_{BUS}$ constant, if the power consumption of the power receiving device 300R exceeds a power which can be supplied by the power feed device 2008, a situation may occur in which the bus voltage $V_{BUS}$ drops to stop the charging.

The above problems may occur not only in the USB PD standard or the USB type-C standard but also in a power feed system having a similar configuration and protocol.

SUMMARY

The present disclosure provides some embodiments of a power receiving device which is capable of fully utilizing a communication function between a power feed device and the power receiving device.

According to one embodiment of the present disclosure, there is provided a power receiving device which receives power from a power feed device via a removable cable, including: a battery; a charging circuit configured to charge the battery with a bus voltage received from the power feed device via the cable; and a controller configured to communicate with the power feed device and instruct a target value of the bus voltage. The controller adaptively changes the target value of the bus voltage according to a state of the power receiving device.

According to this embodiment, it is possible to adaptively supply a desirable bus voltage to the power receiving device having a state changing from moment to moment.

For example, the state of the power receiving device may include a state of the battery, a state of a load (power consumption/current consumption), a state of the cable, other various electrical or physical states, and the like. The state of the battery includes a voltage, a current, an SOC (State Of Charge), a temperature and the like of the battery. The state of the load includes a power consumption of the load, a sleep state of the load, and the like.

The controller may change get value of the bus voltage based on at least a voltage of the battery.

The controller may change the target value of the bus voltage so as to increase an efficiency of the charging circuit.

The power receiving device may further include a power supply device configured to receive a system voltage corresponding to at least one of the bus voltage and the voltage of the battery and supply a power source voltage to a load. The controller may change the target value of the bus voltage based on at least a state of the load.

The controller may change the target value of the bus voltage so as to prevent a feed current from the power feed device from running short. Thus, it is possible to prevent the bus voltage from dropping which disables charging the battery.

The charging circuit may include a DC/DC converter. The efficiency of the DC/DC converter depends on both its input voltage, i.e., the bus voltage, and its output voltage, i.e., the battery voltage. Therefore, at least one bus voltage (input voltage) giving the maximum efficiency for a plurality of values of the battery voltage (output voltage) may be obtained in advance.

The charging circuit may include a linear regulator. In this case, the efficiency of the charging circuit can be improved by changing the target value of the bus voltage so that a potential difference between the input and the output of the charging circuit 304 becomes small.

The power receiving device and the power feed device may comply with USB PD Power Delivery) standard or USB type-C standard.

According to another embodiment of the present disclosure, there is provided an electronic apparatus which includes the above-described power receiving device.

According to another embodiment of the present disclosure, there is provided a controller used in a power receiving device including, in addition to the controller, a battery, a charging circuit which charges the battery with a bus voltage received from a power feed device via a cable, and an internal bus or a signal line which connects at least the power receiving device and the controller. The controller includes: a communication part configured to communicate with the power feed device; and a processor including an interface which communicates with the charging circuit via the internal bus or the signal line and acquires a voltage of the battery. The processor is configured to adaptively change a target value of the bus voltage based on at least the voltage of the battery.

The processor may hold a table defining a correspondence relationship between the voltage of the battery and the target value of the bus voltage.

The correspondence relationship between the voltage of the battery and the target value of the bus voltage may be determined so as to increase an efficiency of the charging circuit.

The power receiving device may further include a power supply device which receives a system voltage corresponding to at least one of the bus voltage and the voltage of the battery and supplies a power source voltage to one or more loads. The controller may receive information indicating a power consumption of the loads from a microcomputer, which is one of the loads, and may change the target value of the bus voltage based on the received information within a range in which a feed power from the power feed device does not fall below the power consumption of the loads.

Any combinations of the above-described elements or changes of the representations of the present disclosure between methods, apparatuses and systems are effective as embodiments of the present disclosure.

DETAILED DESCRIPTION

Figure 1:
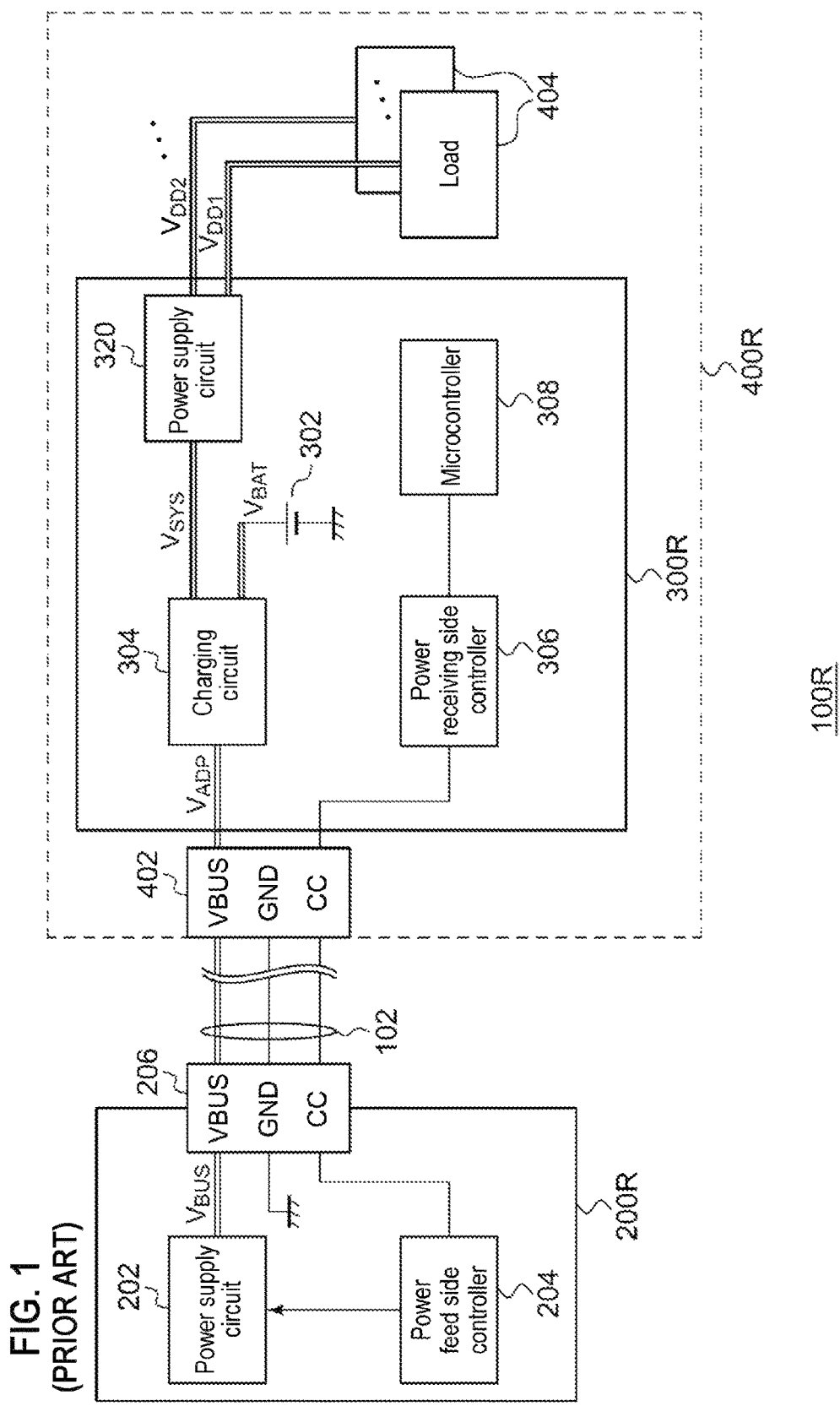
FIG. 1 is a block diagram of a power feed system studied by the present inventor.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

Figure 3:
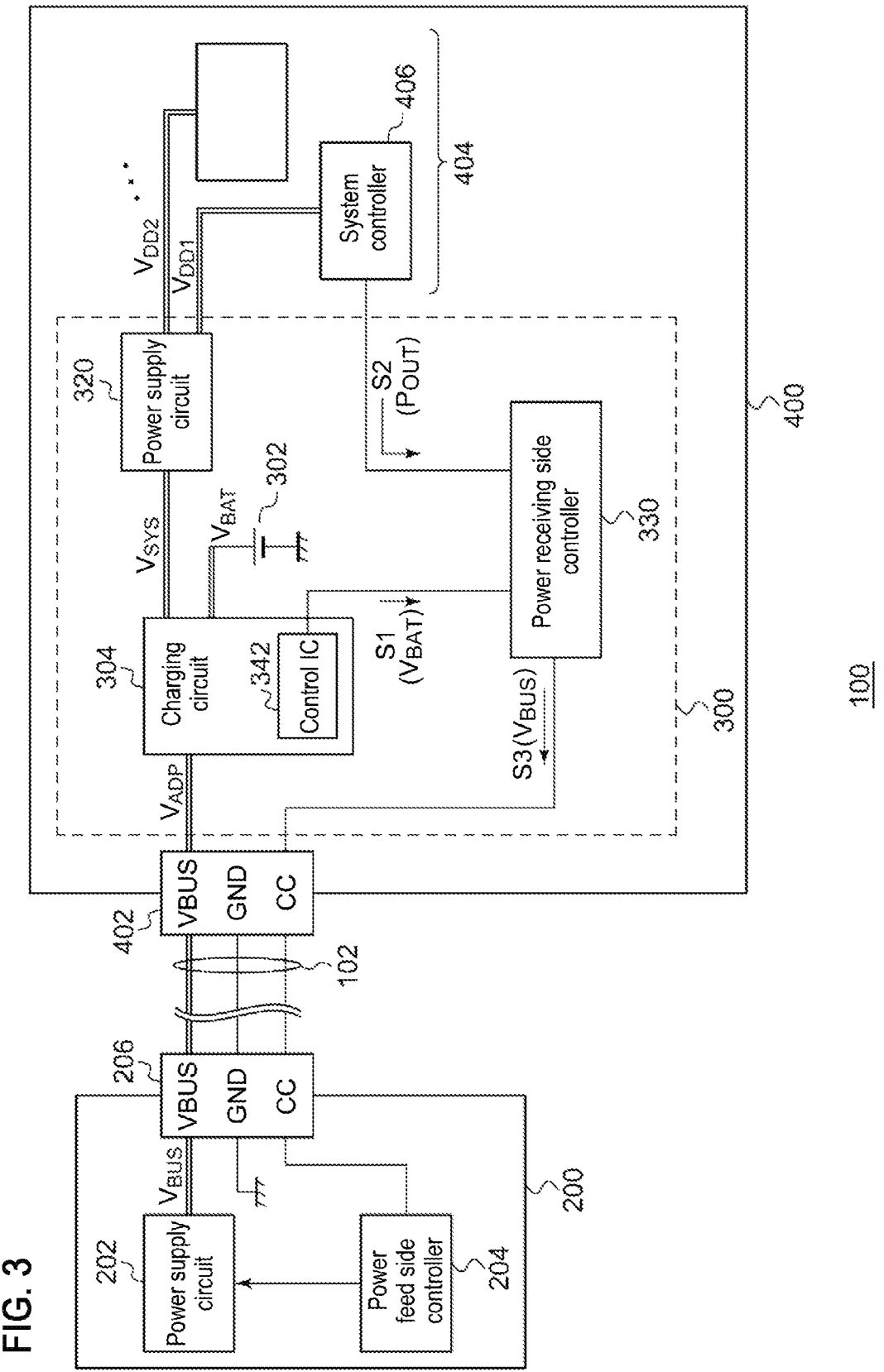
FIG. 3 is a block diagram of a power feed system according to an embodiment.

FIG. 3 is a block diagram of a power feed system 100 according to an embodiment. The power feed system 100 includes a power feed device 200 and a power receiving device 300.

The power feed device 200 conforms to the USB PD standard and may be a USB host or a USB charger (AC adapter) with or without a host function, or may be a USB charger mounted on a dual-role terminal of a host device. The power receiving device 300 as a power feed destination is connected to a receptacle (also referred to as a USB port or a USB plug) 206 via a USB cable 102. The power receiving device 300 is typically a USB device but may be a dual-role terminal of a host device or a terminal having a host function.

In this embodiment, it is assumed that the power feed system 100 conforms to the USB type-C, and the USB cable 102 is provided with a CC line in addition to a VBUS line and a GND line.

The power feed device 200 has the same configuration as that of FIG. 1. Specifically, a power supply circuit 202 generates a DC bus voltage $V_{BUS}$ to be supplied to the power receiving device 300. A power feed side controller 204 is connected to a power receiving side controller (hereinafter simply referred to as a controller) 330 via a CC terminal and the USB cable 102. The power feed side controller 204 and the controller 330 provide a communication function between the power feed device 200 and the power receiving device 300. In the USB PD standard that supports no USB type-C, the CC terminal is omitted and the power feed side controller 204 and the controller 330 are configured to communicate with each other via a bus line.

Next, the power receiving device 300 will be described. The power receiving device 300 is mounted on an electronic apparatus 400. The electronic apparatus 400 includes a receptacle 402 and a load 404 in addition to the power receiving device 300. The load 404 includes a CPU, a memory, a liquid crystal display, an audio circuit, various application processors, a baseband IC and the like. The power feed device 200 is detachably connected to the receptacle 402 via the USB cable 102.

The power receiving device 300 includes a battery 302, a charging circuit 304, a power supply circuit 320 and the controller 330.

The battery 302 is a rechargeable secondary battery. The charging circuit 304 receives a voltage $V_{ADP}$ corresponding to the bus voltage $V_{BUS}$ from the power feed device 200 via the USB cable 102 and charges the battery 302 with the voltage $V_{ADP}$. The charging circuit 304 is not particularly limited in its configuration and is composed of a step-down DC/DC converter, a linear regulator or a combination thereof. The charging circuit 304 must satisfy a relationship of $V_{ADP} > V_{BAT}$ in order to charge the battery 302.

A system voltage $V_{SYS}$ corresponding to at least one of the adapter voltage $V_{ADP}$ and the voltage $V_{BAT}$ of the battery 302 is supplied from the charging circuit 304 to the power supply circuit 320. The power supply circuit 320 steps up or steps down the system voltage $V_{SYS}$ and supplies a power source voltage $V_{DD}$ to one or more loads 404. The power supply circuit 320 may be a multi-channel power supply including a plurality of power supplies such as a DC/DC converter, a linear regulator and the like, and a power management IC (Integrated Circuit) for controlling the plurality of power supplies.

The controller 330 integrally controls the power receiving device 300 and has a function of communicating with the power feed side controller 204. When a link with the power feed side controller 204 is established, the controller 330 negotiates with the power feed side controller 204 to determine the bus voltage $V_{BUS}$. This point is the same as the above-described conventional power receiving device 300R. The controller 330 may be a single IC or module or may include a plurality of ICs.

In this embodiment, the controller 330 further adaptively changes a target value bus voltage $V_{BUS}$ according to the state of the power receiving device 300 even during the charging of the battery 302, and transmits data S3 indicating the target value to the power feed device 200.

The state of the power receiving device 300 which is referred to by the controller 330 in controlling the bus voltage $V_{BUS}$ may include a state S1 of the battery 302 and a state of input power or output power, in other words, a state S2 of the load 404. The state S1 of the battery 302 includes a voltage $V_{BAT}$, a current (charging/discharging current) $I_{BAT}$, an SOC (State Of Charge), that is, a residual capacity, a temperature and the like of the battery 302. The state S2 of the load 404 includes a power consumption of the load 404, a sleep state of the load 404, and the like.

The power receiving device 300 can monitor its own ever-changing state. Therefore, by predefining a desirable level of the bus voltage $V_{BUS}$ corresponding to the state of the power receiving device 300, it is possible to adaptively supply the desirable bus voltage $V_{BUS}$ to the power receiving device 300.

Next, the control of the bus voltage $V_{BUS}$ by the controller 330 will be described in detail.

(1) First Control

The above-described adaptive control of the bus voltage $V_{BUS}$ can be used to improve the efficiency of the charging circuit 304, for example. That is, the controller 330 may change the target value of the bus voltage $V_{BUS}$ so as to increase the efficiency of the charging circuit 304.

As described above, the charging circuit 304 is composed of a DC/DC converter or a linear regulator. The efficiency of the DC/DC converter and the linear regulator depends on its input voltage, that is, the bus voltage $V_{BUS}$, and its output voltage, that is, the battery voltage $V_{BAT}$ ($V_{SYS}$). Therefore, the controller 330 obtains at least one bus voltage (input voltage) $V_{BUS}$ that gives the maximum efficiency (or the equivalent efficiency thereof) for a plurality of values of the battery voltage (output voltage) $V_{BAT}$ beforehand and holds the bus voltage $V_{BUS}$ in a processor. Then, the controller 330 may change the target value of the bus voltage $V_{BUS}$ based on at least the voltage $V_{BAT}$ of the battery 302.

In a case where the bus voltage $V_{BUS}$ giving the maximum efficiency of the charging circuit 304 depends not only on the battery voltage $V_{BAT}$ but also on the temperature and the charging/discharging current, the controller 330 can take into consideration the temperature and the current in addition to the battery voltage $V_{BAT}$.

Figure 2:
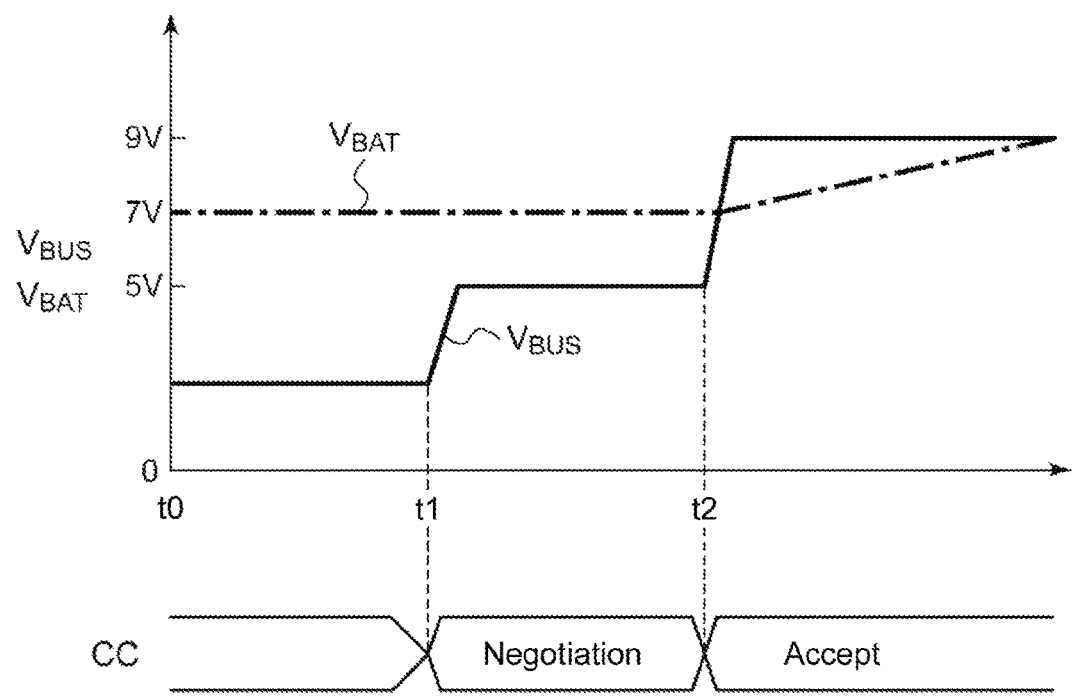
FIG. 2 is a graphical diagram showing a process of determining a bus voltage $V_{BUS}$ in the USB PD standard of FIG. 1.
Figure 4:
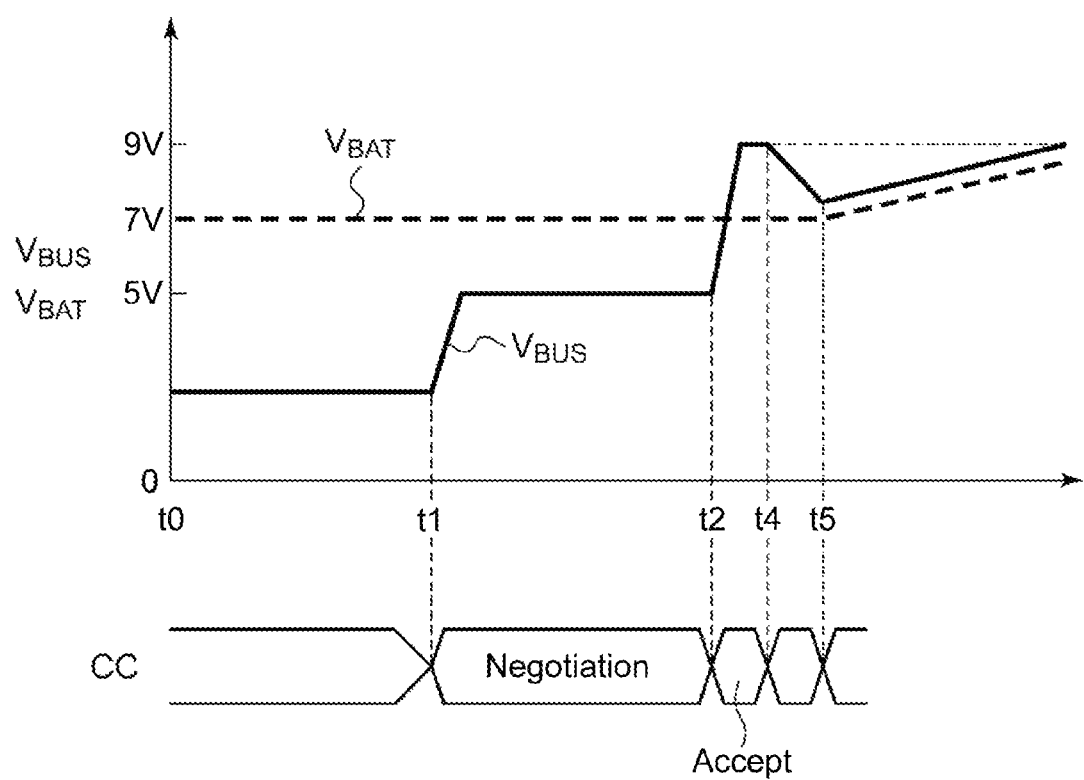
FIG. 4 is a waveform diagram showing adaptive control of a bus voltage $V_{BUS}$ based on a battery voltage $V_{BAT}$.

FIG. 4 is a waveform diagram showing the adaptive control of the bus voltage $V_{BUS}$ based on the battery voltage $V_{BAT}$. The number of cells and conditions of the battery are the same as in FIG. 2. The operation from time t0 to time t2 is the same as the conventional one in FIG. 2. At time t2, the target value of the bus voltage $V_{BUS}$ once becomes 9 V determined by negotiation. Thereafter, the controller 330 determines the bus voltage $V_{BUS}$ which provides the maximum efficiency, based on the battery voltage $V_{BAT}$ and instructs the power feed device 200 via the CC line. In response to this instruction, the power supply circuit 202 raises the bus voltage $V_{BUS}$. During the progress of charging, as the battery voltage $V_{BAT}$ rises and the bus voltage $V_{BUS}$ giving the maximum efficiency changes, the controller 330 changes the target value of the bus voltage $V_{BUS}$ and reports the target value to the power feed device 200 (t4). This operation is repeated (t4, t5, . . . ) so that the target value of the bus voltage $V_{BUS}$ is adaptively controlled. According to the first control, the charging circuit 304 can be operated with high efficiency.

(Second Control)

The adaptive control of the bus voltage $V_{BUS}$ may be performed in consideration of a relation with the current supply capability of the power feed device 200. When the electronic apparatus 400 requests a predetermined amount of power, an input current (supply current from the power feed device 200) is inversely proportional to an input voltage (bus voltage). If the target value of the bus voltage $V_{BUS}$ is changed in consideration of only the efficiency of the charging circuit 304, there is a possibility that the current supply capability of the power feed device 200 becomes insufficient and the power required by the load 404 cannot be obtained. Therefore, the controller 330 may change the target value of the bus voltage $V_{BUS}$ so that the supply current from the power feed device 200 does not run short. Thus, it is possible to prevent the bus voltage $V_{BUS}$ from being dropped to make the charging impossible due to the insufficient current capability of the power feed device 200.

In this case, the controller 330 needs to estimate the power consumption of the load 404. A system controller 406 (see FIG. 3), which is one of the loads 404, integrally controls the entire electronic apparatus 400. Therefore, the system controller 406 grasps the operation state of the other circuit blocks, so that it is possible to estimate the power consumption of the load 404 with high accuracy or roughly. The controller 330 may receive information S2 indicating the power consumption (that is, an output power $P_{OUT}$ of the power receiving device 300) from the system controller 406 and reflect the information S2 in the control of the target value of the bus voltage $V_{BUS}$. Alternatively, the current supplied from the charging circuit 304 to the power supply circuit 320 may be monitored and the power consumption may be estimated based on this current.

In addition, the input power of the electronic apparatus 400 also includes a charging power to the battery 302. Therefore, the controller 330 may reflect the charge current $I_{BAT}$ of the battery 302 in the target value of the bus voltage $V_{BUS}$.

(Third Control)

The adaptive control of the bus voltage $V_{BUS}$ may be performed in consideration of a power loss of the cable 102. For example, a poor USB cable 102 may include a bus line having a significantly large resistance. Flowing a large amount of current through such a cable increases a loss, and may result in a shortage of the adapter voltage $V_{ADP}$ due to a voltage drop, an increase in heat generation in the USB cable 102, and the like, which are undesirable. Therefore, when the loss of the USB cable 102 is large, the power receiving device 300 may increase the target value of the bus voltage $V_{BUS}$ to reduce the amount of current flowing through the cable. The resistance of the USB cable 102 can be estimated from a difference between the target value of the bus voltage $V_{BUS}$ generated by the controller 330 and an actually supplied adapter voltage $V_{ADP}$.

The several controls described above may be used alone or in proper combination.

Note that, even though the function of finely setting the bus voltage between 5 V, 9 V, 12 V and 20 V is implemented in the USB PD standard and the USB type-C standard, the above function of the power receiving device 300 according to the embodiment should not be confused with the conventional one. Conventionally, when the bus voltage $V_{BUS}$ is set to 5.2 V by an adjustment function, the set value is fixed even if the state of the power receiving device 300 changes, which is different from the present disclosure.

Figure 5:
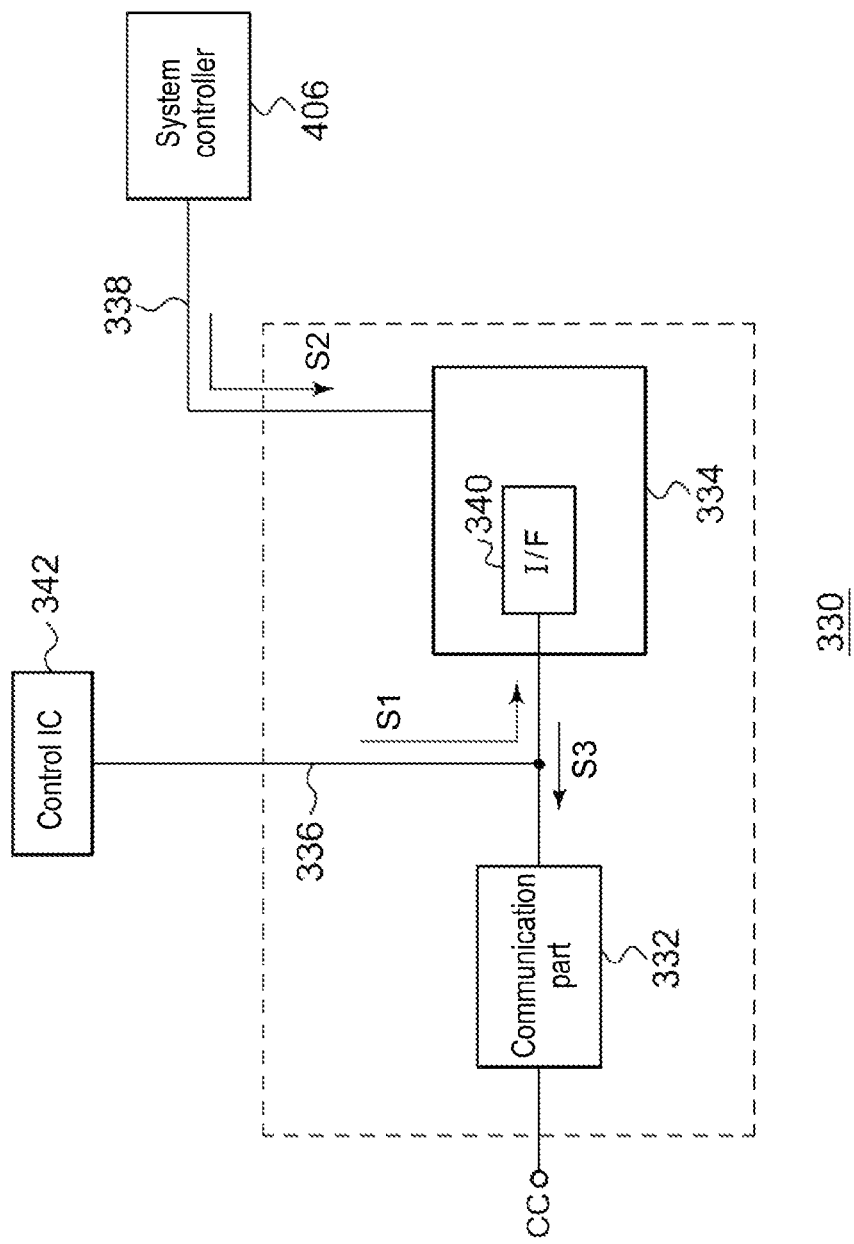
FIG. 5 is a view illustrating a configuration example of a controller of a power receiving device.

FIG. 5 is a view illustrating a configuration example of the controller 330 of the power receiving device 300. For example, the controller 330 includes a communication part 332 and a processor 334. The communication part 332 may be a port controller which implements a physical layer of the USB type-C and communicates with the power feed side controller 204 via the CC line. The processor 334 may be a microcontroller that integrally controls the power receiving device 300. The communication part 332 and the processor 334 may be configured as separate hardware or may be configured as a single chip. The configuration of the controller 330 is not particularly limited.

For example, the charging circuit 304 includes a charging control IC 342 or a fuel gauge IC. The processor 334 includes an interface 340 which is connected to the charging control IC 342 via an internal bus 336 and reads the information S1 indicating the voltage of the battery 302. The processor 334 may set the target value of the bus voltage $V_{BUS}$ based on the battery voltage $V_{BAT}$ read from the charging circuit 304. The internal bus 336 may be an I²C (Inter IC) bus or an SPI (Serial Peripheral Interface). Alternatively, the internal bus may be replaced with a signal line such as GPIO (General Purpose Input/Output). Similarly, the processor 334 and the system controller 406 are connected via an internal bus 338 or a signal line. The system controller 406 may be connected to the internal bus 336.

Alternatively, if the processor 334 contains an A/D converter, the battery voltage $V_{BAT}$ may be input to this A/D converter to allow the processor 334 to directly acquire the battery voltage $V_{BAT}$.

Incidentally, the processor 334 may include a table defining a relationship between the target value of the bus voltage $V_{BUS}$ and the battery voltage $V_{BAT}$ and the target value may be determined by referring to the table. Alternatively, an arithmetic formula indicating the relationship may be defined and the processor 334 may calculate the target value based on the arithmetic formula.

The present disclosure has been described above by way of embodiments. The disclosed embodiments are illustrated only. It should be understood by those skilled in the art that various modifications to combinations of elements or processes may be made and such modifications fall within the scope of the present disclosure. Such modifications will be described below.

In the embodiment, the USB PD standard or the USB type-C standard is taken as an example, but the present disclosure is not limited thereto. For example, the present disclosure can also be used in the next generation USB standards and their derivatives to e developed in the future, and independent standards such as QuickCharge 2.0.

(Applications)

Figure 6:
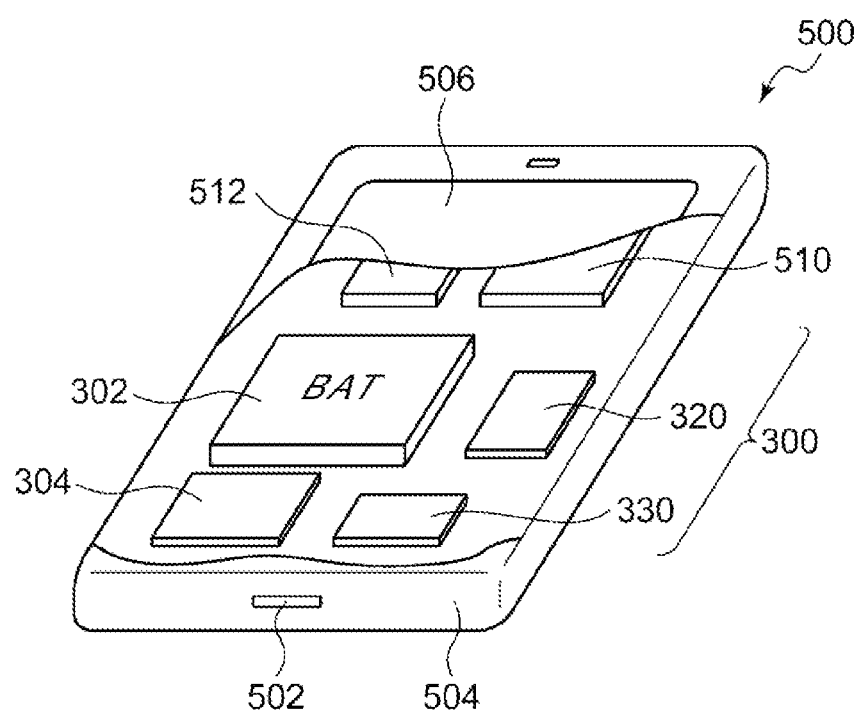
FIG. 6 is a perspective view of an electronic apparatus including a power feed device.

Finally, applications of the power receiving device 300 will be described. FIG. 6 is a perspective view of an electronic apparatus 500 including a power feed device 200. The electronic apparatus 500 as an example is a smart phone or a tablet terminal. The electronic apparatus 500 includes the above-described power receiving device 300 in addition to a receptacle 502, a housing 504, a display panel 506, a CPU 510 and a baseband IC 512. The power receiving device 300 supplies a power source voltage to loads such as the CPU 510 and the baseband IC 512 while charging the battery 302. The electronic apparatus 500 may be a notebook PC, a digital camera, a digital video camera, an audio player or the like.

According to the present disclosure in some embodiments, it is possible to provide a power receiving device which is capable of fully utilizing a communication function between a power feed device and the power receiving device, while solving problems which may occur in conventional power feed systems.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power receiving device which receives power from a power feed device via a removable cable, comprising:
   a battery;
   a charging circuit configured to charge the battery with a bus voltage received from the power feed device via the cable;
   a controller configured to communicate with the power feed device and instruct a target value of the bus voltage; and
   an internal bus or a signal line which connects at least the power receiving device and the controller,
   wherein the controller comprises:
     a communication part configured to communicate with the power feed device; and
     a processor including an interface which communicates with the charging circuit via the internal bus or the signal line to acquire a voltage of the battery, and communicates with the communication part via the internal bus or the signal line to instruct the power feed device, and
   wherein the processor is configured to:
     determine the target value of the bus voltage based on at least the voltage of the battery;
     instruct the power feed device such that the bus voltage becomes the target value to charge the battery; and
     instruct, after the bus voltage becomes the target value, the power feed device to adaptively change the target value based on the voltage of the battery during a progress of charging the battery.

2. The power receiving device of claim 1, wherein the controller changes the target value of the bus voltage based on at least the voltage of the battery.

3. The power receiving device of claim 1, wherein the controller changes the target value of the bus voltage so as to increase an efficiency of the charging circuit.

4. The power receiving device of claim 1, further comprising:
   a power supply device configured to receive a system voltage corresponding to at least one of the bus voltage and a voltage of the battery and supply a power source voltage to a load,
   wherein the controller changes the target value of the bus voltage based on at least a state of the load.

5. The power receiving device of claim 4, wherein the controller changes the target value of the bus voltage so as to prevent a feed current from the power feed device from running short.

6. The power receiving device of claim 1, wherein the charging circuit includes a DC/DC converter.

7. The power receiving device of claim 1, wherein the charging circuit includes a linear regulator.

8. The power receiving device of claim 1, wherein the power receiving device and the power feed device comply with USB PD (Power Delivery) standard or USB type-C standard.

9. An electronic apparatus comprising a power receiving device of claim 1.

10. A controller used in a power receiving device including, in addition to the controller, a battery, a charging circuit which charges the battery with a bus voltage received from a power feed device via a cable, and an internal bus or a signal line which connects at least the power receiving device and the controller, the controller comprising:
- a communication part configured to communicate with the power feed device; and
- a processor including an interface which communicates with the charging circuit via the internal bus or the signal line to acquire a voltage of the battery, and communicates with the communication part via the internal bus or the signal line to instruct the power feed device,
- wherein the processor is configured to:
  - determine a target value of the bus voltage based on at least the voltage of the battery;
  - instruct the power feed device such that the bus voltage becomes the target value to charge the battery; and
  - instruct, after the bus voltage becomes the target value, the power feed device to adaptively change the target value based on the voltage of the battery during a progress of charging the battery.

11. The controller of claim 10, wherein the processor holds a table defining a correspondence relationship between the voltage of the battery and the target value of the bus voltage.

12. The controller of claim 11, wherein the correspondence relationship between the voltage of the battery and the target value of the bus volt is determined so as to increase an efficiency of the charging circuit.

13. The controller of claim 10, wherein the power receiving device further includes:
- a power supply device which receives a system voltage corresponding to at least one of the bus voltage and the voltage of the battery and supplies a power source voltage to one or more loads, and
- wherein the controller receives information indicating a power consumption of the loads from a microcomputer, which is one of the loads, and changes the target value of the bus voltage based on the received information so as to prevent a feed current from the power feed device from running short.

14. The controller of claim 10, wherein the controller is integrated on a single semiconductor substrate.

15. The controller of claim 10, wherein the processor is configured to adjust an amount of current flowing through the cable based on a difference between the target value of the bus voltage and the bus voltage received from the power feed device.

* * * * *